(12) United States Patent
Shizu

(10) Patent No.: US 9,502,936 B2
(45) Date of Patent: Nov. 22, 2016

(54) THREE-PHASE AC MOTOR

(71) Applicant: OKUMA Corporation, Niwa-gun, Aichi (JP)

(72) Inventor: Tatsuya Shizu, Aichi (JP)

(73) Assignee: OKUMA CORPORATION (JP)

( * ) Notice: Subject to any disclaimer, the term of this patent is extended or adjusted under 35 U.S.C. 154(b) by 480 days.

(21) Appl. No.: 14/167,560

(22) Filed: Jan. 29, 2014

(65) Prior Publication Data
US 2014/0210297 A1    Jul. 31, 2014

(30) Foreign Application Priority Data

Jan. 29, 2013    (JP) .................................. 2013-014578
Dec. 18, 2013    (JP) .................................. 2013-260913

(51) Int. Cl.
*H02K 3/00*    (2006.01)
*H02K 3/28*    (2006.01)

(52) U.S. Cl.
CPC ...................................... *H02K 3/28* (2013.01)

(58) Field of Classification Search
CPC ....................................................... H02K 3/12
USPC ................ 310/180, 184, 195, 198, 202–203, 310/205–207
See application file for complete search history.

(56) References Cited

U.S. PATENT DOCUMENTS

| | | | | |
|---|---|---|---|---|
| 5,343,105 A | * | 8/1994 | Sakabe | H02K 19/22 310/179 |
| 5,770,910 A | * | 6/1998 | Horst | H02K 3/487 310/214 |
| 7,605,514 B2 | * | 10/2009 | Ito | H02K 3/28 310/179 |
| 8,536,754 B2 | * | 9/2013 | Dajaku | H02K 1/165 310/180 |
| 2012/0175990 A1 | | 7/2012 | Yokochi | |

FOREIGN PATENT DOCUMENTS

| | | |
|---|---|---|
| JP | 2-30270 U | 2/1990 |
| JP | 11-308795 A | 11/1999 |
| JP | 2012-135133 A | 7/2012 |

* cited by examiner

*Primary Examiner* — Jose Gonzales Quinones
(74) *Attorney, Agent, or Firm* — McCarter & English, LLP

(57) ABSTRACT

A plurality of coils $C_1$ to $C_m$ that constitutes a whole winding L of each phase is divided into g coil groups $G_1$ to $G_g$ for each phase. Each coil group is, for example, constituted by coils $C_1$ to $C_4$ wound around four polar teeth continuously disposed. The number of turns of respective end coils $C_1$ to $C_4$ of the coil group is less than the number of turns of central coils $C_2$ and $C_3$. Further, the whole winding L includes n partial windings $N_1$ to $N_n$, in which a coil Cj (j is an integer in the range from 1 to m) is constituted by n sub coils S(1,j) to S(n,j) that are formed by the n partial windings. It is feasible to set a non-integer value as an effective number of turns of a coil when the number of turns of each sub coil is appropriately selected.

18 Claims, 12 Drawing Sheets

THREE-PHASE AC MOTOR

CROSS-REFERENCE TO RELATED APPLICATIONS

This application claims priority to Japanese Patent Applications No. 2013-014578 filed on Jan. 29, 2013 and No. 2013-260913 filed on Dec. 18, 2013, which are incorporated herein by reference in their entirety.

FIELD OF THE INVENTION

The present invention relates to a three-phase AC motor, and more particularly relates to a winding configuration of the wiring.

BACKGROUND OF THE INVENTION

An electric motor (hereinafter, referred to as "motor") includes a stator that generates a rotating magnetic field and a rotor that can rotate around its rotational shaft while interacting with the generated rotating magnetic field. The rotating magnetic field can be generated when electric power is supplied to a wiring wound around the stator. In a case where the electric power supplied to the wiring is three-phase AC power, the electric motor is referred to as a three-phase AC motor.

A three-phase AC motor is conventionally used to drive a main spindle or a feed shaft of a machine tool. In particular, a three-phase AC synchronous motor is commonly used as a driving source because it can accurately control the angular position or the rotational speed of a rotor. Hereinafter, the three-phase AC synchronous motor is described in detail below.

FIG. 1 is a cross-sectional view illustrating essential parts of a conventional electric motor 900. The electric motor 900 includes a stator 90 and a rotor 93. The stator 90 has a cylindrical body, which has a cylindrical inner surface on which a plurality of polar teeth $T_1$ to $T_{18}$ are arrayed in the circumferential direction. In the illustrated example, the number of the polar teeth $T_1$ to $T_{18}$ is eighteen (18). Each space between two neighboring polar teeth is referred to as a slot. As illustrated in the drawing, the stator 90 has eighteen slots $S_1$ to $S_{18}$. Windings 91, disposed along a winding path that goes into each slot, are wound around each polar tooth in such a way as to form a magnetic pole. The illustrated windings 91 of the electric motor 900 have a concentrated winding, which is characterized by winding the wire around one polar tooth in a concentrated fashion.

The winding configuration of the windings 91 is described in detail below with reference to FIG. 2 and FIG. 3. FIG. 2 schematically illustrates an electric motor. In the drawing, a portion indicated by M is the electric motor 900. Three lines extending outward from the portion M are three-phase leads of the electric motor 900. Each helical line in the portion M is a winding provided in the electric motor 900. A winding configuration of a U-phase winding (i.e., one of the three-phase windings), which is positioned between U and X windings, is described in detail below with reference to FIG. 3. The winding 91 is wound three turns around each of three consecutive polar teeth $T_2$, $T_3$, and $T_4$ successively, to form three coils $C_1$, $C_2$, and $C_3$. Further, the winding 91 is wound three turns around each of three consecutive polar teeth $T_{11}$, $T_{12}$, and $T_{13}$, which are spaced from the polar teeth $T_2$, $T_3$, and $T_4$, to form three coils $C_4$, $C_5$, and $C_6$ at respective polar teeth $T_{11}$, $T_{12}$, and $T_{13}$. The number of times the winding is wound around one polar tooth is generally referred to as a "number of turns." The number of turns of each coil illustrated in FIG. 3 is three (3). Each of the V-phase and W-phase windings is similar to the U-phase winding in that the winding 91 is successively wound around each of three consecutive polar teeth and then successively wound around another three polar teeth, which are spaced from the preceding three polar teeth, although the polar teeth are not the same. As a result, U-phase, V-phase, and W-phase concentrated winding coils can be formed in increments of three polar teeth.

On the other hand, the rotor 93 includes a ring 95 coupled with a magnetic member 94 and a plurality of permanent magnets 96 that are fixed to the magnetic member 94 (see FIG. 1). The above-mentioned electric motor 900 is characteristic in that a plurality of coils of the same phase are continuously disposed in the circumferential direction. Therefore, the magnetic flux to be formed when electric power is supplied to the winding 91 has a trapezoidal distribution, according to which the magnitude of the magnetic flux is substantially constant in most of the entire range of consecutive coils and suddenly attenuates at the end of the consecutive coils. The trapezoidal distribution is not desirable in that a torque ripple tends to occur.

To reduce the torque ripple, it may be effective to optimize the shape of each polar tooth that constitutes the stator, as discussed in Japanese Utility Model Publication Laid-Open No. Hei 2-30270. More specifically, a front end surface of each polar tooth that faces the rotor is curved in such a way as to set the distance between the polar tooth and the rotor to be shorter at the center, and longer at each end of the front end surface in the circumferential direction. However, increasing the distance between the front end of a polar tooth and the rotor is not desired because the magnetic force acting between the polar tooth and the rotor is weakened undesirably. Further, as discussed in Japanese Patent Publication Laid-Open No. Hei 11-308795, a skew structure may be employable. More specifically, the skew structure includes a groove formed on an outer cylindrical surface of a cylindrical rotor core in such a way as to incline relative to a rotational shaft. However, the skew structure is not desired in that the torque constant tends to decrease. Further, a distributed winding (i.e., a winding different from the concentrated winding) may be employable.

As mentioned above, the number of turns of the coil illustrated in FIG. 3 is three. The number of turns of an electric motor is determined taking demanded performance specifics into consideration. In general, it is known that the voltage to be generated across a winding of the electric motor is proportional to the number of turns of the winding and a temporal change amount of the magnetic flux that intersects the winding. Therefore, in a case where the current supply to an electric motor is constant, the torque to be generated by the motor increases in accordance with the increase in the number of turns. On the other hand, the voltage to be generated across the winding increases in accordance with the increase in the number of turns. The voltage to be generated across the winding becomes larger in proportion to the rotational speed of the electric motor. Therefore, when the number of turns increases, the voltage to be generated across the winding increases when the rotational speed is high. If the voltage to be generated across the winding reaches a power source voltage of an amplifier that supplies electric power to the electric motor, the electric motor cannot be driven because it is unfeasible to supply current from the amplifier to the electric motor. Accordingly, the number of turns of a winding is determined so that a desired power (i.e., a product of the rotational speed and the torque) can be obtained when the current is supplied in a range where the voltage to be generated across the winding does not exceed a permissible value having been determined beforehand.

In general the number of turns of a coil is an integer and takes a discrete value. Therefore, it may be difficult to optimize a relationship between the output and the voltage to be generated across the wiring. The relationship between the power and the voltage to be generated across the winding is described in detail below with reference to FIG. 4 and FIG. 5. FIG. 4 illustrates a relationship between a base rotational speed nb, a maximum rotational speed nt, and an output p0 required to attain the demanded performance. In a case where the number of turns of a coil is two (2), it is feasible to set the voltage to be generated across the winding to be equal to or less than the permissible value in the entire rotational range (from 0 to nt). However, the torque to be generated is smaller and the required output p0 cannot be obtained at the base rotational speed nb. In FIG. 5, a dotted line indicates output characteristics obtainable in this case. If the number of turns is increased to three (3) to attain the required output p0, the voltage to be generated across the winding may exceed the permissible value in a higher speed region. Therefore, it is necessary to reduce the current to be supplied to the winding in such a way as to reduce the voltage to be generated across the winding in a speed region exceeding the permissible value (i.e., rotational speed nc or more). As a result, the required output cannot be obtained in a higher speed region. In FIG. 5, a solid line indicates output characteristics obtainable in this case. The required performance illustrated in FIG. 4 may be attained if it is feasible to set the number of turns to be a value between two (2) and three (3). As discussed in Japanese Patent Publication Laid-Open No. 2012-135133, it is conventionally known to set the number of turns to be a non-integer value in a distributed winding type winding.

With the concentrated winding type winding, it is easy to perform coil forming operations, compared to the distributed winding type winding. However, the concentrated winding type winding tends to cause a torque ripple. Further, if the number of turns of the winding is an integer, the demanded performance specifics cannot be sufficiently attained, as will be understood from the relationship between the output at a lower rotational speed and the voltage to be generated in the winding at a higher rotational speed.

SUMMARY OF THE INVENTION

The present invention intends to realize at least one of reducing the torque ripple and employing a non-integer value as the number of turns, in an electric motor that includes a concentrated winding type winding.

A three-phase AC motor according to an embodiment of the present invention includes a stator that includes T polar teeth arrayed in a circumferential direction and a set of windings that form a plurality of coils wound in a concentrated manner around the polar tooth, and a rotor disposed in a confronting relationship with the T polar teeth. A plurality of coils that constitute the set of windings of each three-phase phase are divided into g coil groups for each phase. Each coil group is constituted by coils wound around h polar teeth continuously disposed. Further, d coils of a coil group continuously disposed from the end thereof share at least one polar tooth of a neighboring coil group. The following relationship is satisfied when T represents the number of teeth, g represents the number of coil groups, h represents the number of consecutive coils, and d represents the number of coils sharing teeth: $T=3 \times g \times (h-d)$ The set of windings is constituted by n partial windings that are parallel to each other. One coil of the set of windings is constituted by n sub coils having a predetermined number of turns, which are formed by the n partial windings. A total number of turns of sub coils that belong to one partial winding is common between respective partial windings. The number of turns of a coil that shares a polar tooth (i.e., an effective number of turns of a coil that shares at least one polar tooth with the neighboring coil group) is less than the number of turns of a coil that monopolizes a polar tooth (i.e., an effective number of turns of a coil that does not share any polar tooth with the neighboring coil group). The effective number of turns is a value obtainable by dividing a total number of turns of n sub coils that constitute one coil by n, more specifically, a mean value.

When the effective number of turns of a coil that shares a polar tooth (i.e., an end coil of the coil group), which is one of a plurality of coils that constitutes a coil group, is set to be less than that of a central coil, it is feasible to reduce the magnetic flux density gradually or stepwise from the center to the end. Thus, the torque ripple can be reduced.

At least one coil included in the coil group can be constituted by a plurality of types of sub coils that can be discriminated in the number of turns. More specifically, it is unnecessary to unify the sub coils constituting one coil in the number of turns. Employing a plurality of sub coils differentiated in the number of turns is effective in setting an effective number of turns of a coil constituted by these sub coils to be a non-integer value.

Respective coils that share at least one polar tooth with the neighboring coil group can have the same number of turns. Further, respective coils that do not share any polar tooth with the neighboring coil group can have the same number of turns.

The number of turns of coils that share one polar tooth is equal to the number of turns of coils that monopolize (i.e. do not share) a polar tooth.

The number of turns of coils that share a polar tooth is a half that of coils that monopolize a polar tooth.

According to some embodiments of the present invention, the sum of the numbers of turns of the sub coils that are located at positions having the same electrical angle, among the sub coils belonging to a certain partial winding, may be configured to be equal for all of the partial windings. With this arrangement, the phases of the voltages induced in the respective partial windings become uniform, so that generation of circulating current is prevented.

According to some embodiments of the present invention, it is desirable to configure such that the number of turns of each tooth-sharing coil that shares a polar tooth with a neighboring coil group is equal for the respective tooth-sharing coils, also such that the number of turns of each tooth-monopolizing coil that does not share a polar tooth with a neighboring coil group is equal for the respective tooth-monopolizing coils, and further such that, in a sub coil group which belongs to a certain partial winding and which belongs to a certain coil group, an absolute value of products obtained, for the respective sub coils belonging to that sub coil group, by multiplying a positional deviation and the number of turns of each sub coil is minimum. A positional deviation of a sub coil is an oriented distance, in terms of electrical angle position, from a center position of a coil group to the position of that sub coil. An "oriented distance" is a concept covering not only a distance but also an orientation, and, as used herein, an "oriented distance"

denotes a distance from a center position of a sub coil group, expressed using a positive sign to indicate the motor rotation direction and expressed using a negative sign to indicate the reverse rotation direction. An "oriented distance" may be restated as a "signed distance". By configuring as described above, induced voltage in each individual coil group is suppressed, and as a result, circulating current is suppressed.

According to some embodiments of the present invention, the torque ripple can be reduced in a three-phase AC motor that includes a concentrated winding type winding. Further, it is feasible to attain higher adaptability for demanded performance specifics because the number of turns is not limited to an integer value and can be set to a non-integer value.

DETAILED DESCRIPTION OF EMBODIMENTS OF THE INVENTION

Figure 6:
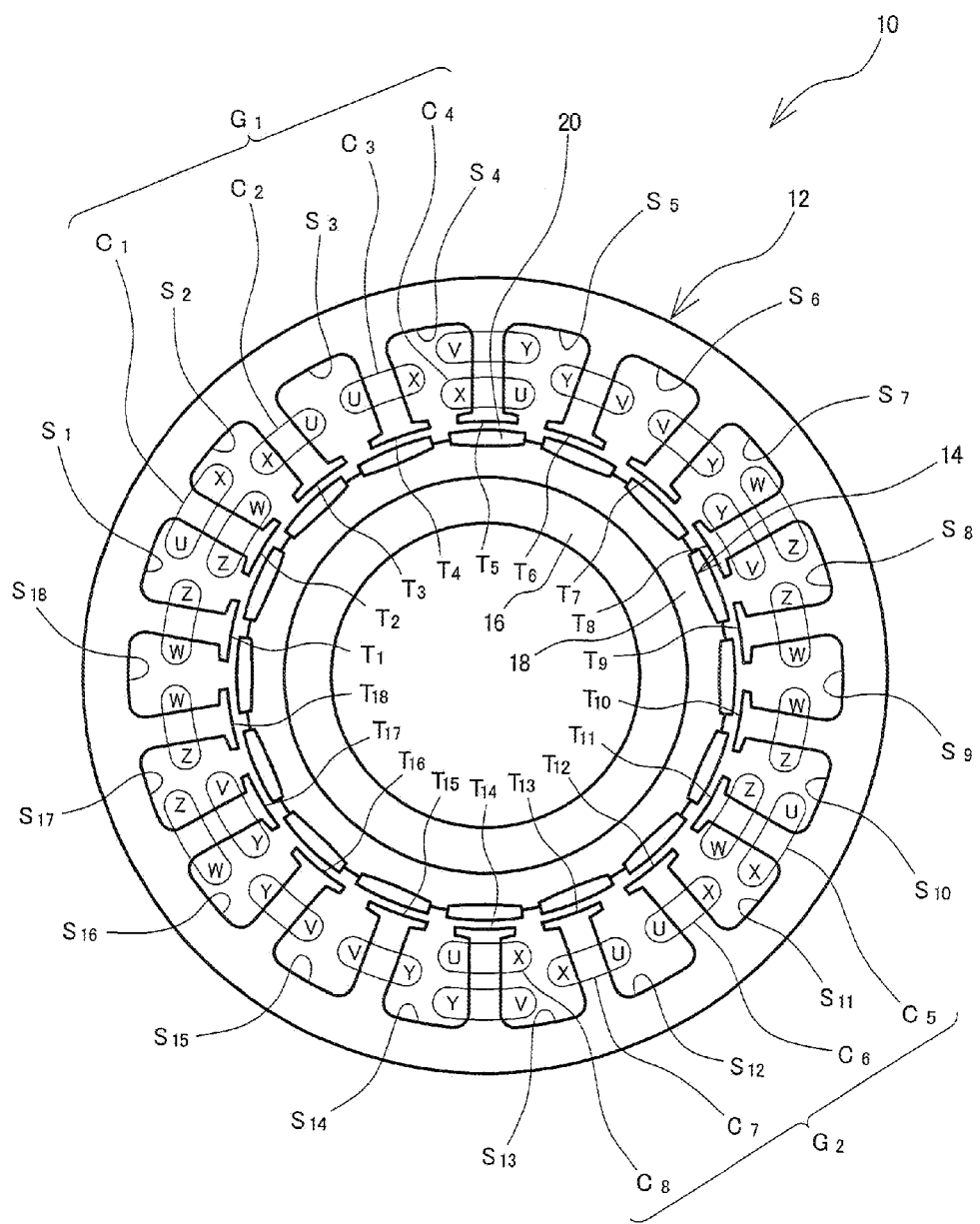
FIG. 6 is a cross-sectional view illustrating an electric motor according to an embodiment of the present invention.

Hereinafter, various embodiments of the present invention are described in detail below with reference to the attached drawings. FIG. 6 illustrates a schematic arrangement of an electric motor 10 according to an embodiment of the present invention. The electric motor 10 includes a stator 12 and a rotor 14. Eighteen polar teeth $T_1$ to $T_{18}$ are arrayed in the circumferential direction on an inner cylindrical surface of the stator 12 that has a cylindrical body. The rotor 14 has a cylindrical shape and is disposed inside the stator 12. An outer cylindrical surface of the rotor 14 is in a confronting relationship with front end surfaces of respective polar teeth. Each space between two neighboring polar teeth, of the polar teeth $T_1$ to $T_{18}$ provided on the inner side of the stator 12, is referred to as a slot. Namely, eighteen slots $S_1$ to $S_{18}$ are provided on the inner side of the stator 12. The rotor 14 includes a magnetic member 18 having an annular or cylindrical shape and coupled around a ring 16. The electric motor 10 includes sixteen permanent magnets 20, which are arrayed in the circumferential direction on an outer cylindrical surface of the magnetic member 18.

The electric motor 10 includes a concentrated winding type winding. The winding of one phase wound round one polar tooth is referred to as a "coil." Four consecutive polar teeth formed continuously in the circumferential direction cooperatively constitute a coil of one phase. According to the example illustrated in FIG. 6, U-phase coils $C_1$ to $C_4$ are formed on polar teeth $T_2$ to $T_5$, respectively. The whole of a plurality of same phase coils formed on consecutive polar teeth is referred to as a "coil group." Further, the number of polar teeth on which one coil group is formed, more specifically, the number of same phase coils consecutively disposed, is referred to as "the number of consecutive coils." In the above-mentioned example, the coils $C_1$ to $C_4$ cooperatively constitute a coil group $G_1$. The number of consecutive coils is four (4). The electric motor 10 illustrated in FIG. 6 includes another U-phase coil group $G_2$. Four coils $C_5$ to $C_8$ formed on consecutive polar teeth $T_{11}$ to $T_{14}$ cooperatively constitute the coil group $G_2$. The electric motor 10 further includes two V-phase coil groups and two W-phase coil groups, each being constituted by eight coils, similar to the above-mentioned U-phase coil groups.

An end coil of one coil group, which is constituted by four coils, shares the same polar tooth with an end coil of a neighboring coil group. More specifically, one end coil $C_1$ of the U-phase coil group $G_1$ shares the polar tooth $T_2$ with an end coil of the neighboring W-phase coil group. Another end coil $C_4$ shares the polar tooth $T_5$ with an end coil of a neighboring V-phase coil group. The number of coils of neighboring coil groups, which commonly use the same polar tooth, is referred to as "the number of coil sharing." The number of coil sharing of the electric motor 10 is one (1).

Figure 7:
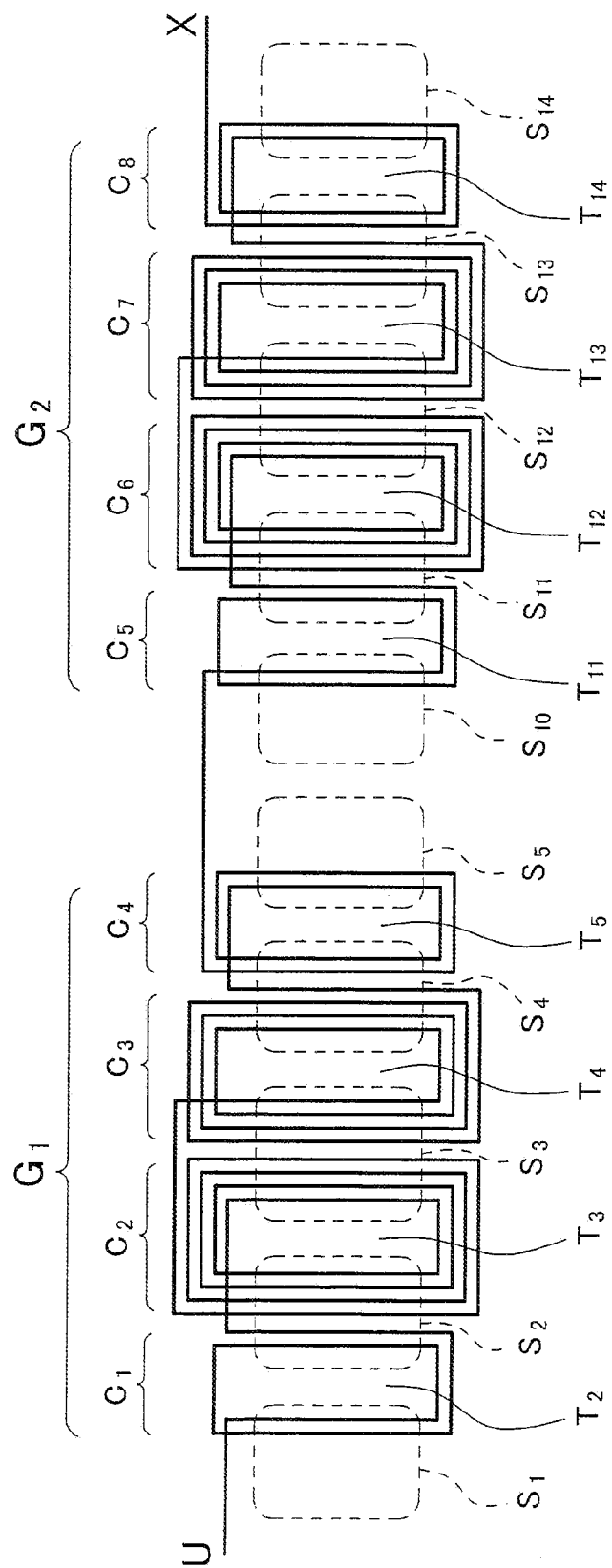
FIG. 7 illustrates an example of a wire winding configuration according to an embodiment of the present invention.

The number of turns of a coil that shares the same polar tooth with a coil of a neighboring coil group, which is hereinafter referred to as an "end coil," is set to be less than the number of turns of another coil (hereinafter, referred to as a "central coil"). FIG. 7 illustrates an example of the above-mentioned setting with respect to the number of turns of respective coils. FIG. 7 illustrates a winding configuration of the U-phase winding. Each of the V-phase winding and the W-phase winding has a similar configuration and therefore redundant description thereof will be avoided. The end coils $C_1$, $C_4$, $C_5$, and $C_8$ are formed by winding the wire two turns. More specifically, the number of turns is two (2). The number of turns of central coils $C_2$, $C_3$, $C_6$, and $C_7$ is four (4). For each polar tooth, the winding may be wound in a single step. This expression "wound in a single step" means that, after the winding is wound around a first polar tooth and then around another polar tooth, the same winding is not again wound around the first polar tooth. When the completed winding is seen from one end thereof, the wire first goes around the first polar tooth and then goes around the second polar tooth (i.e., another polar tooth), and further goes around the third polar tooth (yet another polar tooth). The above-mentioned winding configuration is repeated for the remaining polar teeth. More specifically, the wire never goes around a polar tooth that has been already wound with the wire. According to the example illustrated in FIG. 7, coils can be formed by winding the wire around respective polar teeth successively from the left to the right. When the number of turns of an end coil is set to be less than the number of turns of a central coil, the magnetic flux to be generated by the end coil is less than the magnetic flux to be generated by the central coil. The magnetic flux density becomes smaller at both ends compared to a central magnetic flux density in each coil group. Thus, the above-mentioned winding configuration is effective in suppressing the torque ripple.

In general, the following formula can be used to express the relationship between the number of teeth T, the number of coil groups g, the number of consecutive coils h, and the number of coil sharing d in the above-mentioned winding configuration, more specifically in the winding configuration in which an end coil of one coil group shares a polar tooth with an end coil of a neighboring coil group.

$$T = 3 \times g \times (h - d) \quad (1)$$

The condition that all coils of the coil group do not share polar teeth with other coils is h>2d. When two coils positioned at one end of a coil group share polar teeth with coils of a neighboring coil group (i.e., when the number of coil sharing d=2), these coils may be differentiated from each other in the number of turns. For example, it is feasible to set the number of turns of an endmost coil to be a quarter of the number of turns of the central coil and set the number of turns of a second endmost coil to be a half of the number of turns of the central coil.

The wire winding configuration illustrated in FIG. 7 can be realized only when the number of turns is an integer. In other words, the degree of freedom in design is lower. Hereinafter, a novel winding configuration, according to which the number of turns can be set to a non-integer value, is described in detail below.

Figure 1:
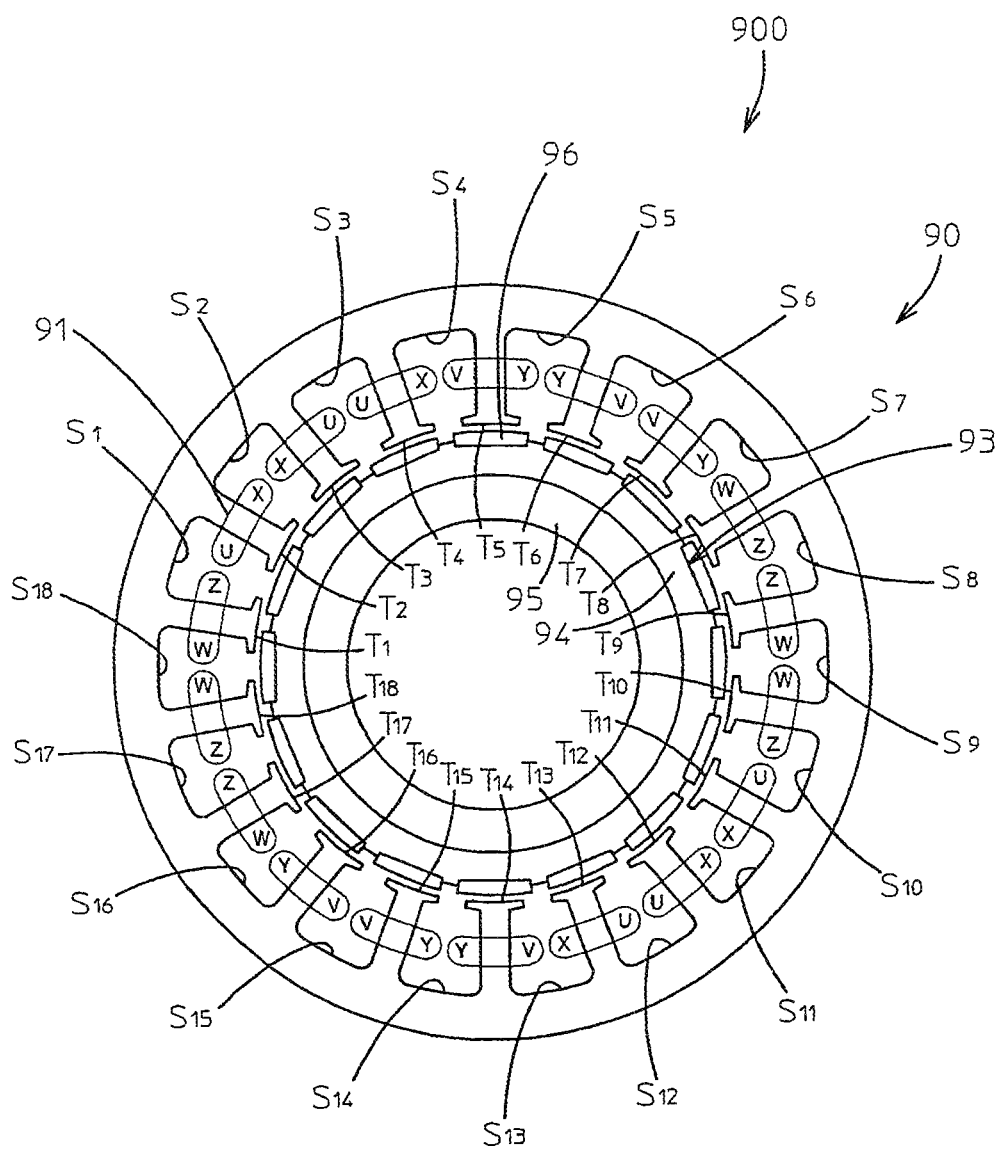
FIG. 1 is a cross-sectional view illustrating a known electric motor.
Figure 2:
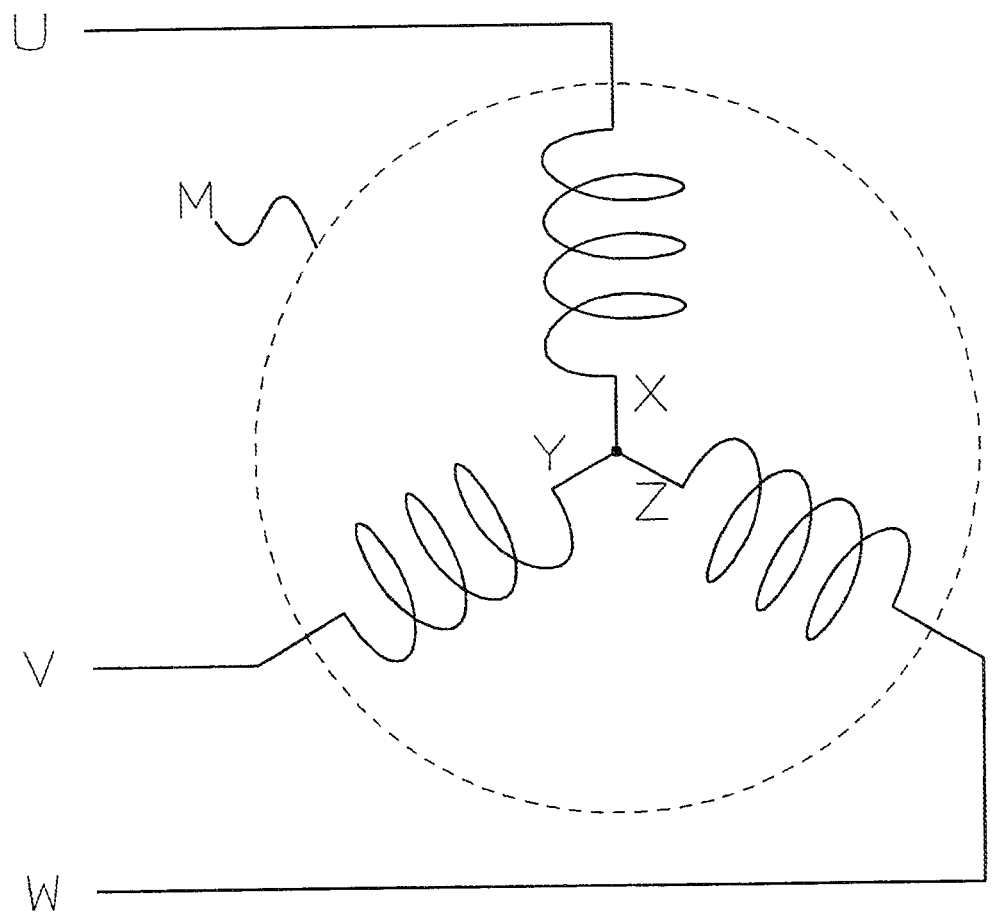
FIG. 2 illustrates an example of an electric motor configuration.
Figure 3:
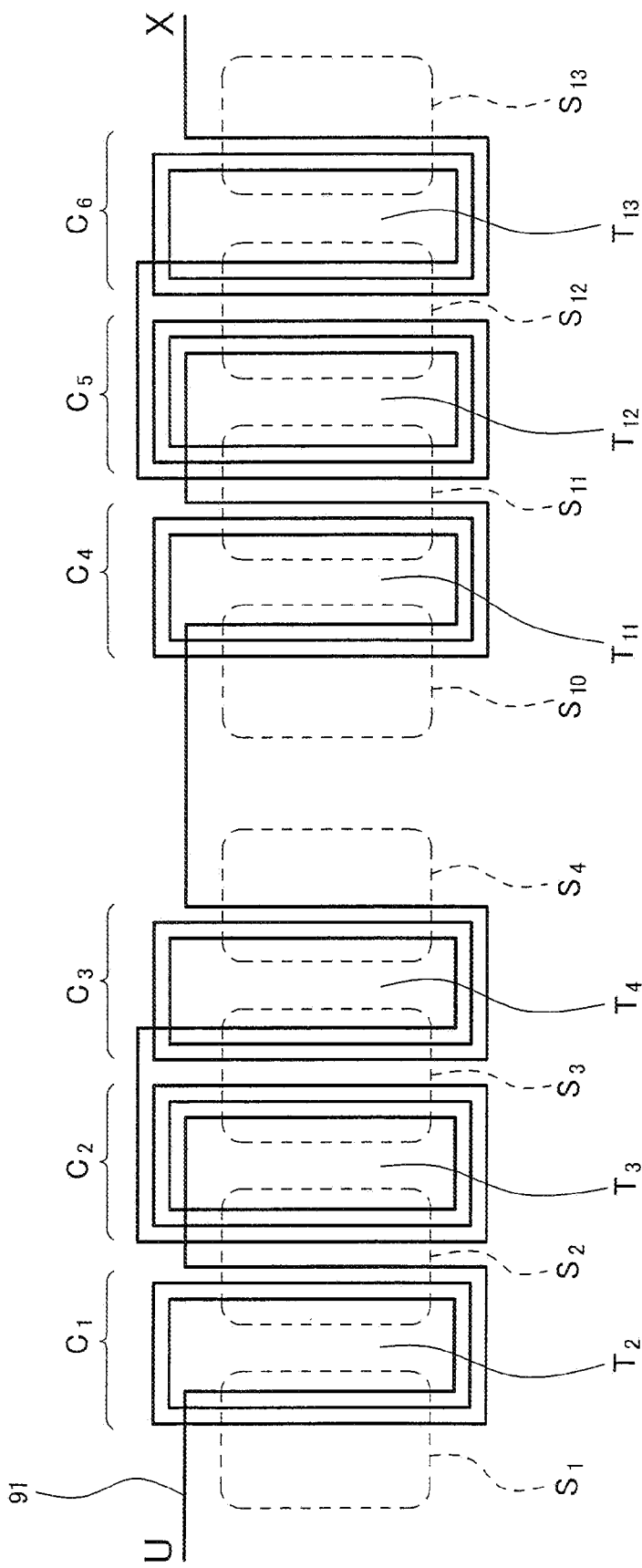
FIG. 3 illustrates an example of a known wire winding configuration.
Figure 4:
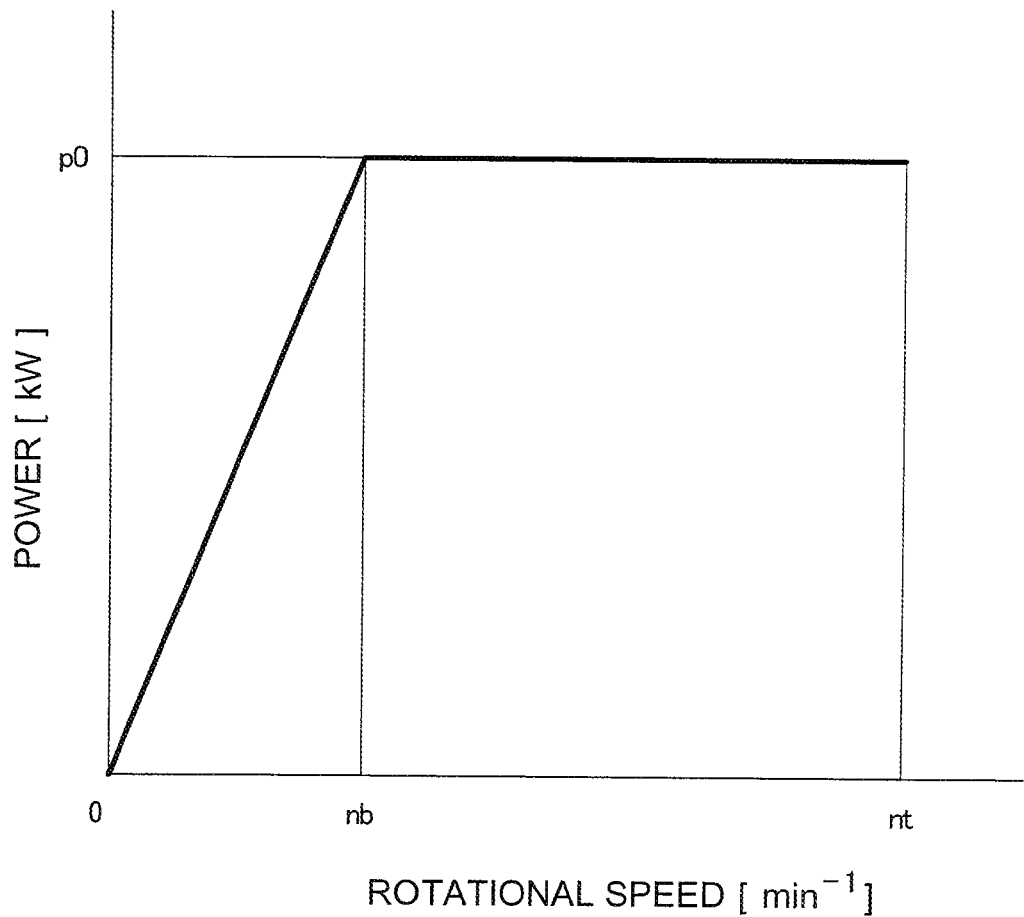
FIG. 4 illustrates an example of required output characteristics of an electric motor.
Figure 5:
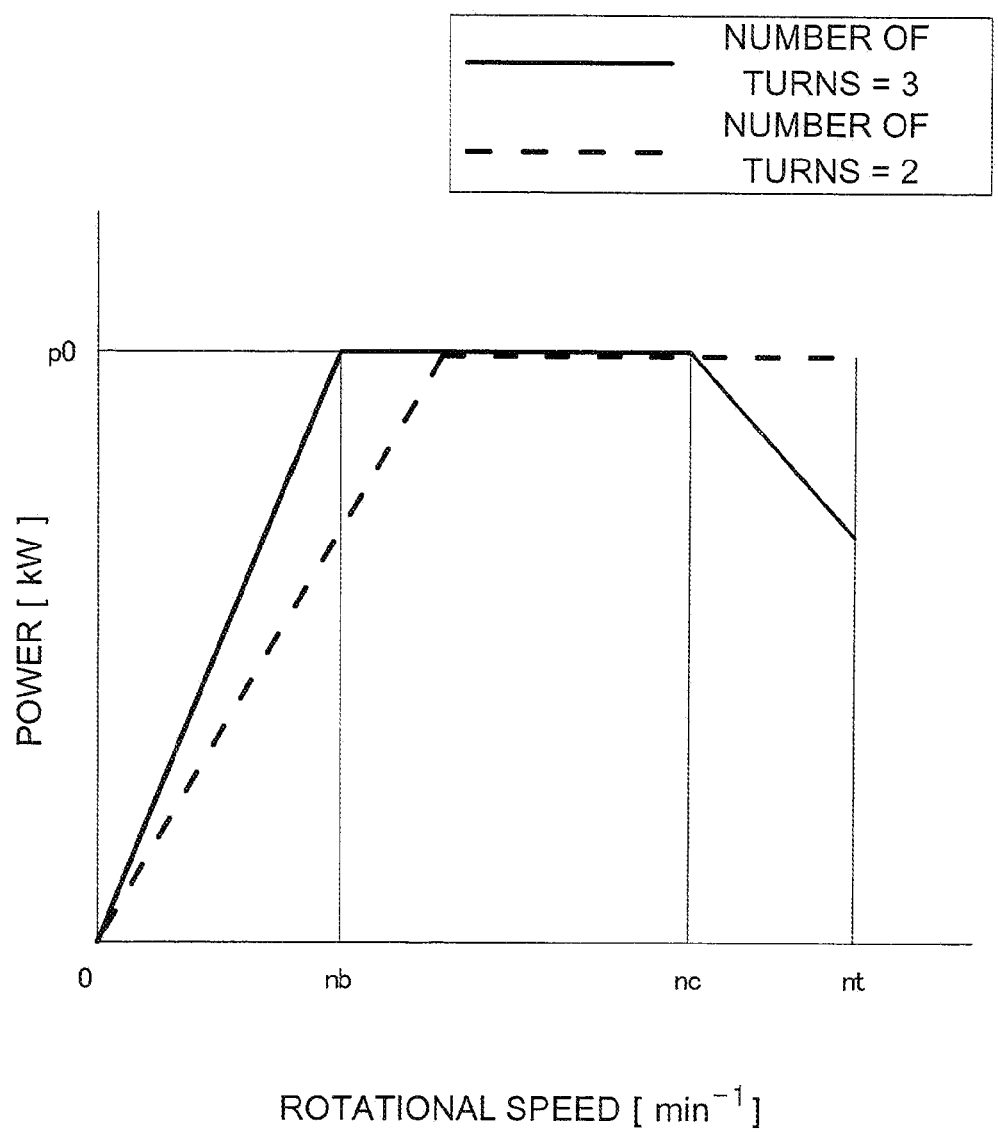
FIG. 5 illustrates an example of actual motor output.
Figure 8:
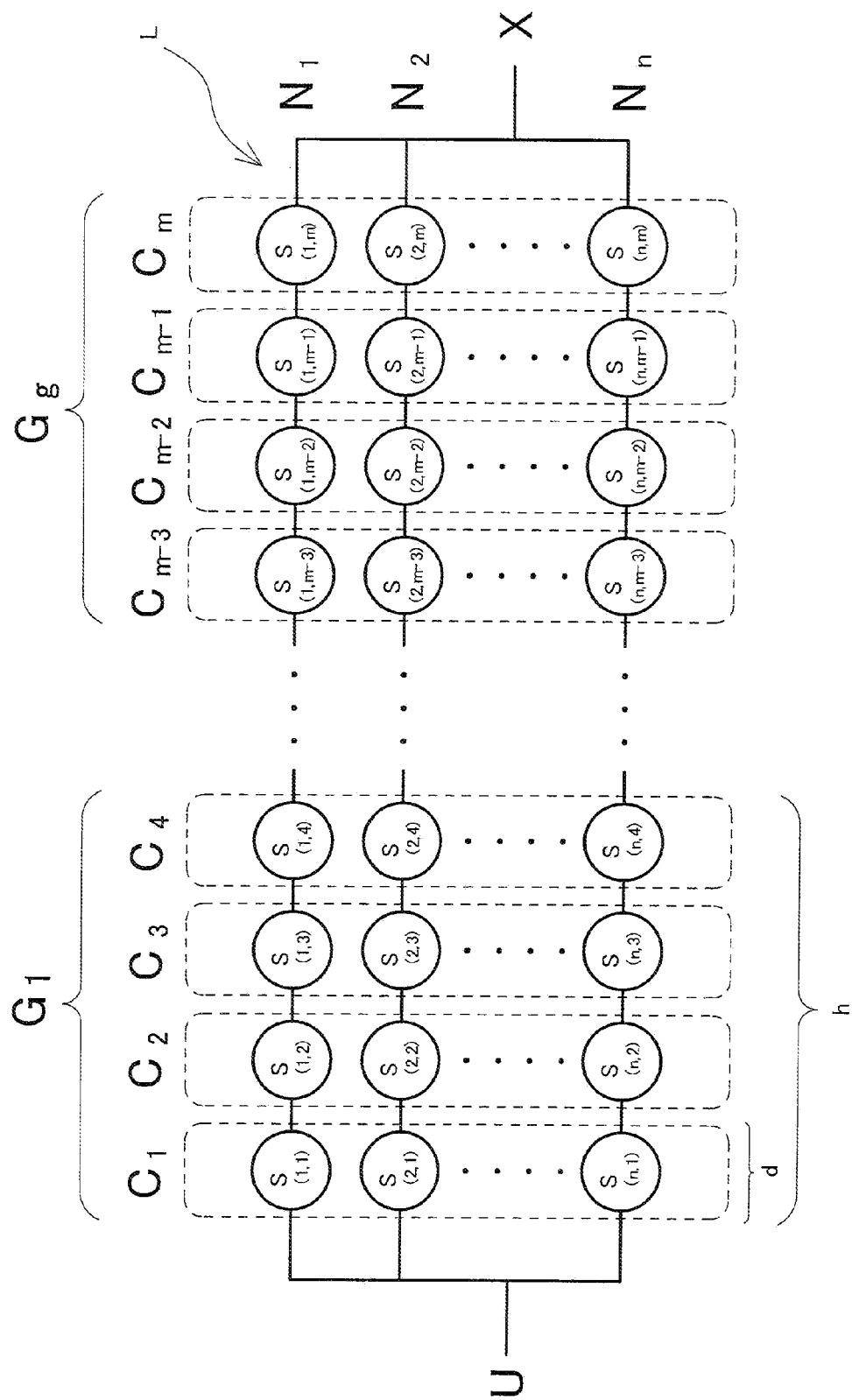
FIG. 8 illustrates another example of the wire winding configuration according to an embodiment of the present invention.

FIG. 8 illustrates an example of a wire winding configuration. More specifically, the configuration of a winding L of the U-phase, i.e., the winding from U to X illustrated in FIG. 2, is illustrated in FIG. 8. The winding L is constituted by n equivalent partial windings $N_1, N_2, \ldots,$ and $N_n$, which are connected in parallel to each other. To explicitly express each winding in the following description, the winding L constituted by n partial windings is hereinafter referred to as "whole winding L." The whole winding L includes g coil groups $G_1, G_2, \ldots,$ and $G_g$. The first coil group $G_1$ is constituted by four coils $C_1, C_2, C_3,$ and $C_4$. The next coil group $G_2$ is constituted by another four coils. The final coil group $G_g$ is constituted by four coils $C_{m-3}, C_{m-2}, C_{m-1},$ and $C_m$. The number of coils included in the whole winding L is m (=g×4). Hereinafter, if it is unnecessary to discriminate each of partial windings, coil groups, and coils, no suffix is allocated to these members. Instead, the partial winding, the coil group, and the coil are simply referred to as partial winding N, coil group G, and coil C. The number of coils C constituting the coil group G (i.e., the number of consecutive coils) is not limited to four (4) and can be generally expressed using a value "h," although the number of coils C is four (4) in the following description. Four coils C that constitute each coil group G are formed around four polar teeth continuously disposed in the circumferential direction.

Respective coils C are constituted by n sub coils $S_{(1,1)}, S_{(1,2)}, \ldots, S_{(1,m)}, S_{(2,1)}, \ldots, S_{(2,m)}, \ldots, S_{(n,1)}, \ldots,$ and $S_{(n,m)}$, which are formed by winding n partial windings N. More specifically, one coil $C_1$ is constituted by n sub coils $S_{(1,1)}, S_{(2,1)}, \ldots,$ and $S_{(n,1)}$ of n partial windings. In other words, coil $C_1$ includes n sub coils, the respective n sub coils belonging to different ones of the n partial windings. The remaining coils have similar configurations. Hereinafter, sub coils are simply referred to as sub coils S without using any suffix if it is unnecessary to discriminate respective sub coils.

The number of turns of the winding that constitutes each sub coil S is expressed using t and a suffix allocated to the sub coil. More specifically, t(1,1) represents the number of turns of a sub coil $S_{(1,1)}$. The number of sub coils S that belong to one partial winding N is m, which represents the number of coils C. A total number of turns of m sub coils S is common between respective partial windings N, and can be expressed using the following formula (2).

$$\sum_{j=1}^{m} t(1,j) = \sum_{j=1}^{m} t(2,j) \quad (2)$$
$$= \ldots$$
$$= \sum_{j=1}^{m} t(n,j)$$

A coil Cj (j is an integer in the range from 1 to m) is constituted by n sub coils $S(1,j), S(2,j), \ldots,$ and $S(n,j)$. As described above, $t(1,j), t(2,j), \ldots,$ and $t(n,j)$ represent the number of turns of respective sub coils $S(1,j), S(2,j), \ldots,$ and $S(n,j)$. The effective number of turns of the coil Cj can be expressed in the following manner.

The magnetic flux $\phi(k,j)$ to be generated by one sub coil $S(k,j)$ (k is an integer in the range from 1 to n) is proportional to the number of turns $t(k,j)$ of the sub coil $S(k,j)$ and current $i(k,j)$ flowing through the sub coil $S(k,j)$, and can be expressed using the following formula (3).

$$\phi(k,j) = \alpha \times i(k,j) \times t(k,j) \quad (3)$$

In the formula (3), $\alpha$ is a proportionality constant. The magnetic flux $\Phi j$ to be generated by one coil Cj is a sum of magnetic fluxes $\phi$ to be generated by respective sub coils S, and can be expressed using the following formula (4).

$$\Phi j = \sum_{k=1}^{n} \phi(k,j) \quad (4)$$
$$= \alpha \sum_{k=1}^{n} \{i(k,j) \times t(k,j)\}$$

The n partial windings N are equivalent to each other as described above. Therefore, the current $i(k,j)$ can be expressed using the following formula (5) in which "I" represents current flowing through the whole winding L.

$$i(k,j) = I/n \quad (5)$$

The following formula (6) is obtainable when the formula (4) is rewritten using the formula (5).

$$\Phi j = \alpha \frac{I}{n} \sum_{k=1}^{n} t(k,j) \quad (6)$$
$$= \alpha I \left\{ \frac{1}{n} \sum_{k=1}^{n} t(k,j) \right\}$$

A value in parentheses { } of the formula (6) is a mean value with respect to the number of turns $t(1,j), t(2,j), \ldots,$ and $t(n,j)$ of the sub coils S that belong to the coil Cj. Further, it is understood that the value in parentheses { } indicates the number of turns of the coil Cj. Therefore, it is understood that the effective number of turns of the coil Cj is a mean value with respect to the number of turns of n sub coils that belong to coil Cj.

In the winding configuration illustrated in FIG. 8, the number of coil groups g can be set to two (2), the number of consecutive coils h can be set to four (4), the number of coil sharing can be set to one, and the number of partial windings n can be set to an arbitrary value. In this case, a winding structure of the coil group G obtainable when the number of turns of the end coils $C_1$, $C_4$, $C_5$, and $C_8$ is set to two (2) and the number of turns of the central coils $C_2$, $C_3$, $C_6$, and $C_7$ is set to four (4) is equivalent to the winding structure illustrated in FIG. 7.

Figure 9:
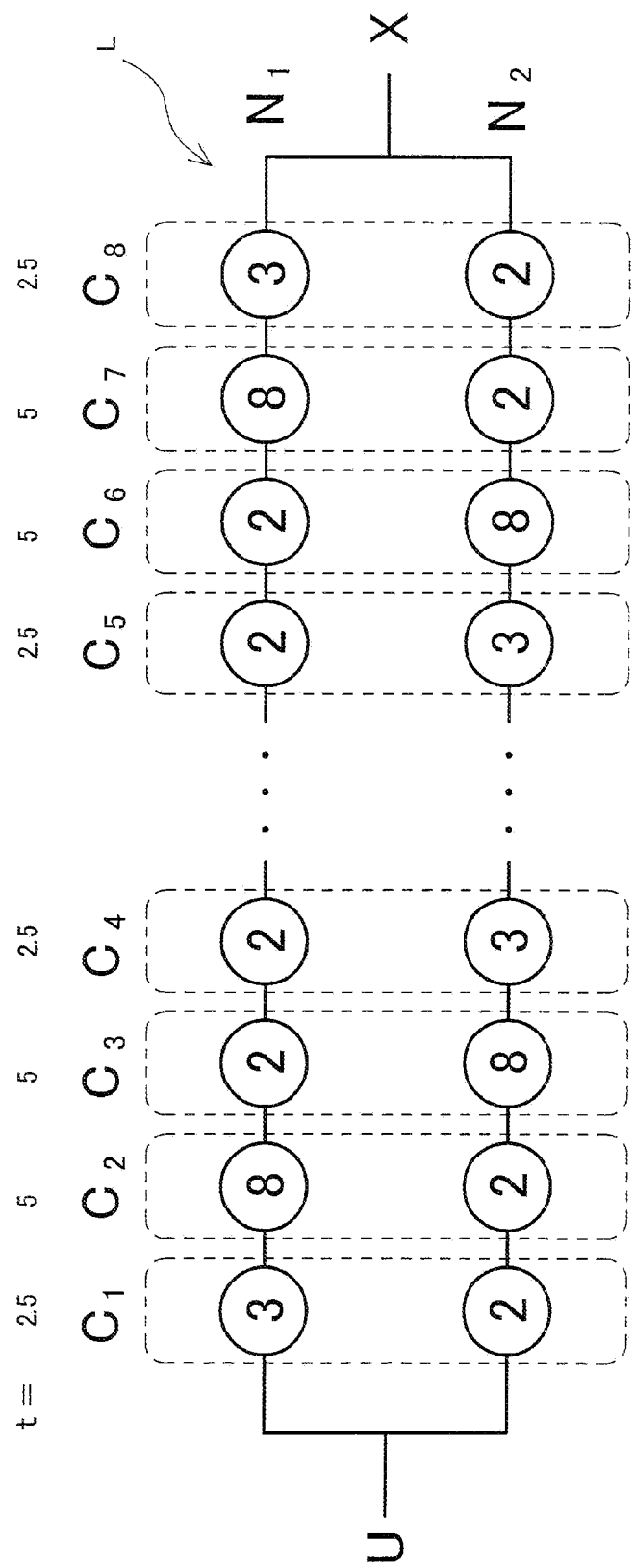
FIG. 9 illustrates another example of the wire winding configuration according to an embodiment of the present invention.
Figure 10:
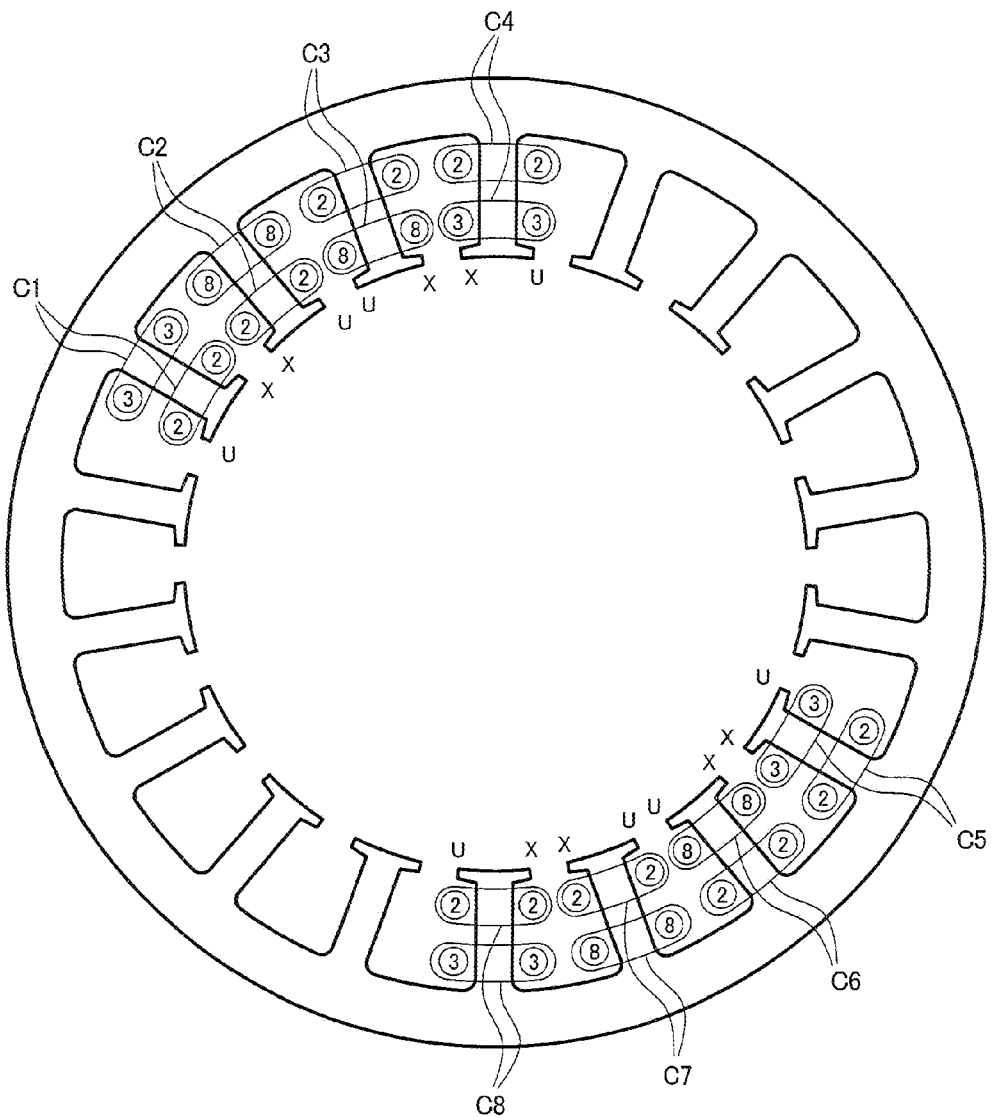
FIG. 10 illustrates another example of the wire winding configuration according to an embodiment of the present invention.

The effective number of turns of the coil C is a mean value with respect to the number of turns of respective sub coils. Therefore, it is feasible to set the number of turns to be a non-integer value (i.e., a fractional value). FIG. 9 illustrates an example of the winding configuration characterized in that the number of turns of the coil C is fractional. Further, FIG. 10 illustrates a state where the whole winding L illustrated in FIG. 9 is arranged on the stator.

The whole winding L illustrated in FIG. 9 has a winding configuration that can be obtained when the number of partial windings n is set to two (2), the number of coil groups g is set to two (2) in the winding configuration illustrated in FIG. 8. The number of consecutive coils is four (4), and the number of coil sharing is one (1). In the drawing, a numerical value described in a circle indicates the number of turns of each sub coil. In the end coils $C_1$ and $C_8$, the number of turns of a sub coil that belongs to the partial winding $N_1$ is three (3) and the number of turns of a sub coil that belongs to the partial winding $N_2$ is two (2). Accordingly, the number of turns of respective end coils $C_1$ and $C_8$ (i.e., the number of turns of each magnetic tooth sharing coil) is two and a half (2.5). In the end coils $C_4$ and $C_5$, the number of turns of a sub coil that belongs to the partial winding $N_1$ is two (2) and the number of turns of a sub coil that belongs to the partial winding $N_2$ is three (3). As mentioned above, each end coil is constituted as a combination of the sub coil whose number of turns is two (2) and the sub coil whose number of turns is three (3). Each of the central coils $C_2$, $C_3$, $C_6$, and $C_7$ is constituted as a combination of a sub coil whose number of turns is eight (8) and a sub coil whose number of turns is two (2). Therefore, the number of turns of respective central coils $C_2$, $C_3$, $C_6$, and $C_7$ (i.e., the number of turns of each magnetic tooth monopolizing coil) is five (5). As another combination with respect to the number of turns of sub coils that can realize the central coil whose number of turns is five (5), it is feasible to employ a combination of three (3) and seven (7), a combination of four (4) and six (6), or a combination of five (5) and five (5).

When the number of turns of each end coil is set to be a half of the number of turns of the central coil as illustrated in FIG. 9, the total number of turns of a coil formed around a polar tooth can be equalized with the total number of turns of a coil formed around another polar tooth. The above-mentioned winding configuration is useful to improve the space factor because the space of each slot can be effectively used. Further, it is feasible to set the number of turns of a central coil to be fractional. The number of turns of the end coil is not limited to a half of the number of turns of the central coil. For example, it is feasible to set the number of turns of the end coil to be less than a half of the number of turns of the central coil. Further, it is feasible to set the number of turns of the end coil to be greater than a half of the number of turns of the central coil and less than the number of turns of the central coil. For example, in a case where the first and second endmost coils of the coil group share polar teeth with coils of a neighboring coil group (i.e., when the number of coil sharing d=2), the number of turns of the first endmost coil can be set to be a third of the number of turns of the central coil and the number of turns of the second endmost coil can be set to be two thirds of the number of turns of the central coil. In this case, the number of turns of the second endmost coil is less than the number of turns of the central coil and is greater than a half of the number of turns of the central coil. Further, it is useful to differentiate the number of turns of each central coil (i.e., each coil that does not share a magnetic tooth with another coil group). For example, in a case where the number of central coils is three, it is feasible to set the number of turns of the midmost central coil to be greater than the number of turns of other central coils.

To improve a space factor (i.e., a ratio of the total cross section of the winding to the entire cross section of each slot), a plurality of conducting wires may be unified together to form the whole winding L. The number of conducting wires to be disposed in each slot is limited to an integer. The total cross section of the conducting wire becomes a discrete value. If the cross section of one conducting wire is large (thick), the clearance between obtainable total cross sections of the conducting wires may become larger and the space factor may become smaller. On the other hand, if the conducting wire is thin, the amount of heat generation becomes larger. The cross section of each conducting wire and the number of conducting wires should be determined considering the balance between the above-mentioned factors. In this case, the number of conducting wires is referred to as "number of parallel wires." When the number of parallel wires of the whole winding L is p, it is desired that each partial winding N be constituted by p/n conducting wires to set n partial windings N that are equivalent to each other and cooperatively constitute the whole winding L. Namely, it is desired that the number of parallel wires that constitute each partial winding N be p/n.

As described above, the winding configuration according to the present embodiment is effective in reducing the torque ripple because the number of turns of an end coil is set to be less than the number of turns of a central coil. Further, in the winding configured to set the number of turns of an end coil to be different from the number of turns of a central coil, it is feasible to set a non-integer value as the number of turns of at least one of the end coil and the central coil. In other words, the winding configuration according to the present embodiment is useful in increasing the degree of freedom in design.

Next, an explanation is given concerning induced voltages generated in the partial windings and a circulating current that may be caused due to the induced voltages. Since the sub coils constituting one partial winding are connected in series, the induced voltage in a partial winding is equal to the sum of the induced voltages generated in the sub coils constituting that partial winding. The amplitude of the induced voltage in each sub coil is proportional to the number of turns of the sub coil. Further, the phase of the induced voltage in each sub coil depends on the position of the sub coil within its coil group. The sub coils constituting one coil group are arranged along the circumferential direction of the stator. In other words, the respective sub coils have different electrical angle positions, and the induced voltages generated in the respective sub coils have different phases. For this reason, depending on the combination of the numbers of turns of the respective sub coils constituting each partial winding and the arrangement of those respective sub coils within the coil group, one or both of the amplitude and the phase of the induced voltage in each partial winding may become different for the respective partial windings. When partial windings in which induced voltages have different amplitudes or phases from each other are present among the partial windings constituting a whole winding set, a current that flows from one partial winding to another partial winding, i.e., a circulating current, is caused. In the configuration shown in FIG. 8, a circulating current may flow from U to X and then to U, so that, in a certain partial winding, a current flow may occur in a direction reverse to the direction of the normal current flow. This may degrade motor efficiency, and may also deteriorate controllability. In order to suppress generation of the circulating current, it is desirable to select a configuration of the numbers of turns and the arrangement (electrical angle positions) of the sub coils such that the amplitudes and the phases of the respective partial windings constituting one whole winding set become uniform. As the arrangement of the sub coils are already determined by the arrangement of the polar teeth, what is ultimately meant by the expression "selecting a configuration of the numbers of turns and the arrangement of the sub coils" is selection of the numbers of turns for the sub coils located in certain electrical angle positions.

When, as shown in FIG. 9, one coil group is constituted with four coils, there are four different phases of induced voltages in the sub coils constituting these coils. In the stator having the structure shown in FIGS. 6 and 9, when the phases of the induced voltages generated in the respective sub coils are expressed in electrical angle while using the sub coil closest to U (i.e., the leftmost sub coil in FIG. 9) within one coil group as the reference, the phase of the second sub coil is 20°, the phase of the third sub coil is 40°, and the phase of the fourth sub coil is 60°. What are specifically covered by the expression "the sub coil closest to U within each coil group" are, according to the notations used in FIG. 8, $S_{(1,1)}$ and $S_{(1,5)}$ in the partial winding $N_1$, and $S_{(2,1)}$ and $S_{(2,5)}$ in the partial winding $N_2$. The sub coil located a-th (a is an integer from 1 to 4) closest to U can be generally expressed as $S_{(1,a)}$ and $S_{(1,a+4)}$ for the partial winding $N_1$, and $S_{(2,a)}$ and $S_{(2,a+4)}$ for the partial winding $N_2$.

As mentioned above, in order to prevent generation of the circulating current, it is necessary to configure such that the amplitude and the phase of the induced voltage become equal for the respective partial windings. One approach for satisfying this requirement is to configure such that, for every one of the four different phases, the amplitude of the induced voltage becomes equal between the respective partial windings. When the amplitudes of the induced voltages are uniform at a certain phase, the induced voltages at that phase do not cause a circulating current. Accordingly, when such a state is achieved for all phases, no circulating current would be generated overall. A state in which the amplitude of the induced voltage at a certain phase is equal for the respective partial windings can be attained by configuring such that the sum of the numbers of turns of the sub coils generating induced voltages having that phase is equal for each partial winding. By configuring as such for all of the phases, the circulating current can be suppressed. In other words, the circulating current can be suppressed by determining the numbers of turns of the sub coils so that the sum of the numbers of turns of the sub coils which belong to a certain partial winding and which are located at positions having the same electrical angle is equal for all of the partial windings.

Further explanation is given referring to FIG. 8. The sum of the numbers of turns of the sub coils $S_{(1,1)}$, $S_{(1,5)}$, $S_{(1,9)}$, . . . , $S_{(1,m-3)}$ which belong to the partial winding $N_1$ and which are located at positions having the same electrical angle (the reference phase) is made equal to that for the other partial windings $N_2$-$N_n$, which may be, for example, the sum of the numbers of turns of the sub coils $S_{(2,1)}$, $S_{(2,5)}$, $S_{(2,9)}$, . . . , $S_{(2,m-3)}$ which belong to the partial winding $N_2$ and which are located at positions having the same electrical angle. With this arrangement, the amplitude of the induced voltage at this phase becomes equal for the respective partial windings $N_1$-$N_n$. Concerning the sub coils having the phase of 20° with respect to the reference phase, in a similar manner, the sum of the numbers of turns of the sub coils $S_{(1,2)}$, $S_{(1,6)}$, $S_{(1,10)}$, . . . , $S_{(1,m-2)}$ which belong to the partial winding $N_1$ and which are located at positions having the same electrical angle (20°) is made equal to that for the other partial windings $N_2$-$N_n$, which may be, for example, the sum of the numbers of turns of the sub coils $S_{(2,2)}$, $S_{(2,6)}$, $S_{(2,10)}$, . . . , $S_{(2,m-2)}$ which belong to the partial winding $N_2$ and which are located at positions having the same electrical angle. The sub coils at the other electrical angle positions (40°,60°) are also configured in similar manners.

Further explanation is given referring to the specific example shown in FIG. 9. Concerning the sub coils located at the reference 0° phase positions, in the partial winding $N_1$, the number of turns of the sub coil $S_{(1,1)}$ is three (3), while the number of turns of the sub coil $S_{(1,5)}$ is two (2), so that the sum is 5 (=3+2). Further, in the partial winding $N_2$, the number of turns of the sub coil $S_{(2,1)}$ is two (2), while the number of turns of the sub coil $S_{(2,5)}$ is three (3), so that the sum is 5 (=2+3). As such, the sum of the numbers of turns of the sub coils located at the positions having the electrical angle of 0° is equal between the partial windings $N_1$ and $N_2$. Moreover, concerning the sub coils located at the 20° phase positions, in the partial winding $N_1$, the numbers of turns of the sub coils $S_{(1,2)}$ and $S_{(1,6)}$ are eight (8) and two (2), respectively, so that the sum is 10 (=8+2). Further, in the partial winding $N_2$, the numbers of turns of the sub coils $S_{(2,2)}$ and $S_{(2,6)}$ are two (2) and eight (8), respectively, so that the sum is 10 (=2+8). As such, the sum of the numbers of turns of the sub coils located at the positions having the electrical angle of 20° is equal between the partial windings $N_1$ and $N_2$. The numbers of turns of the sub coils located at the other electrical angle positions (40°,60°) are also configured in similar manners. By setting the numbers of turns in this way, the amplitude and the phase of the induced voltage in each partial winding become equal between the respective partial windings, so that the circulating current does not flow. Degradation in efficiency and controllability caused by the circulating current can thereby be prevented.

Depending on the configuration of the whole winding L, there may be cases in which the amplitudes and the phases of the induced voltages in the respective partial windings cannot be made equal. Such cases may include, for example, a situation in which the number of coil groups (g) is odd and the effective number of turns of a certain coil is not an integer value. In below, an explanation is given regarding suppression of the circulating current in a case in which the amplitudes and the phases of the induced voltages in the respective partial windings cannot be made exactly equal. In the following explanation, sub coils that belong to one partial winding and also belong to one coil group are collectively referred to as a "sub coil group." For example, in FIG. 8, the four sub coils $S_{(1,1)}$, $S_{(1,2)}$, $S_{(1,3)}$, and $S_{(1,4)}$, all of which belong to the partial winding $N_1$ and also to one coil group $G_1$, constitute one sub coil group.

When the amplitudes and the phases of the induced voltages in the respective partial windings cannot be made equal as described above, the circulating current is suppressed by configuring such that the amplitude and the phase of the induced voltage generated in each sub coil group is as uniform as possible between the respective sub coil groups. The amplitude of the induced voltage generated in a sub coil group is related to the numbers of turns of the sub coils, while the phase of the induced voltage is related to the electrical angle positions of the sub coils. Accordingly, the amplitude and the phase of the induced voltage can be adjusted by adjusting the numbers of turns of the sub coils located at positions having a certain electrical angle.

Since each sub coil group constituted with a plurality (h number) of sub coils functions as a single magnetic pole, the center of the magnetic pole is considered as the reference for electrical angle. The electrical angle position of each sub coil is expressed as a value of deviation from the magnetic pole center. When the deviation is in the direction of increasing electrical angle, the deviation value is expressed using a positive sign, and, when the deviation is in the direction of decreasing electrical angle, the deviation value is expressed using a negative sign. The influence exerted by the induced voltage generated in one sub coil on the induced voltage of the overall sub coil group including this sub coil increases proportionally with the product of the number of turns and the deviation of this sub coil. The induced voltage of the overall sub coil group can be assessed using the sum of the products obtained, for the respective sub coils belonging to this group, by multiplying the number of turns and the deviation of each sub coil. Assuming that the number of turns of the eth sub coil from U is denoted by Be, the following formula (7) can be used as a parameter assessing the induced voltage of a sub coil group.

$$\left| \sum_{e=1}^{h} B_e \cdot \left( \frac{h+1}{2} - e \right) \right| \quad (7)$$

By selecting the numbers of turns of the respective sub coils so that the parameter expressed by the formula (7) becomes minimum, phase differences between the induced voltages in the respective partial windings can be minimized, and the circulating current can thereby be suppressed. Here, since there are limitations on the number of turns of each sub coil due to required motor performance (such as the required output and the allowable torque ripple), the number of turns of each sub coil is selected within those limitations to minimize the above-noted parameter.

Figure 11:
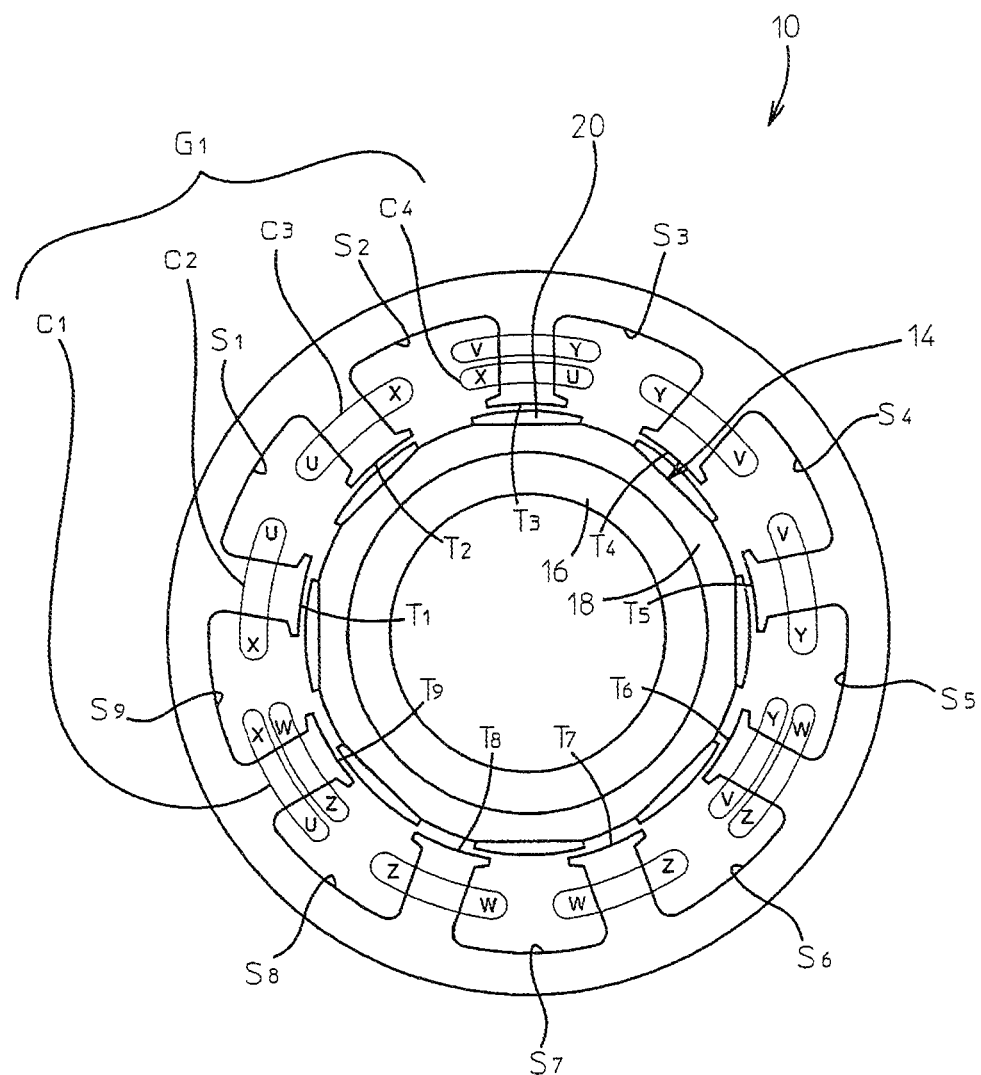
FIG. 11 illustrates another example of the wire winding configuration according to an embodiment of the present invention.
Figure 12:
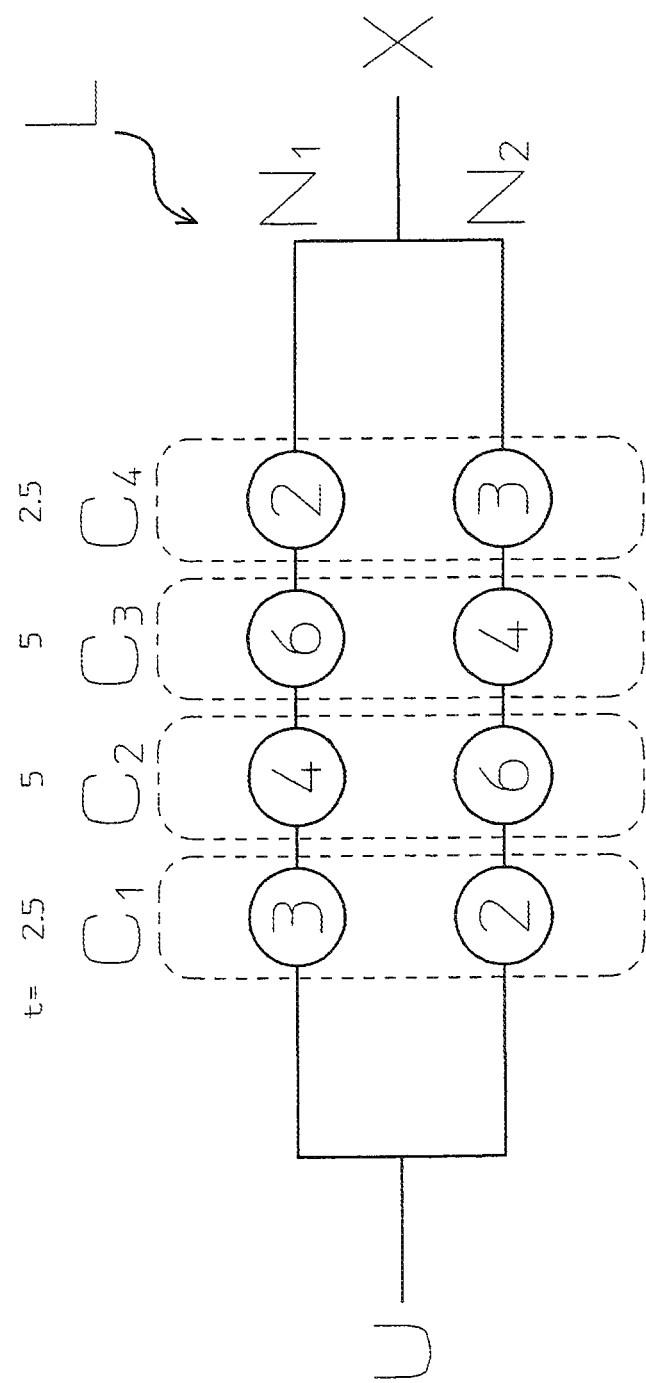
FIG. 12 illustrates another example of the wire winding configuration according to an embodiment of the present invention.

As a specific example of a case in which the amplitude and the phase of the induced voltage cannot be made equal between the respective partial windings, the following description refers to a case in which the number of coil groups (g) is odd, or more specifically, when g=1. FIG. 11 shows a schematic configuration of an electric motor 10 in which the number of coil groups (g) is one (1). In FIG. 11, the differences from FIG. 6 are that, along with the change of the number of coil groups (g) to one (1), the number of polar teeth and slots of the stator 12 is changed to nine (9), and the number of permanent magnets 20 is changed to eight (8). Further, FIG. 12 shows an example winding configuration in which the number of coil groups (g) is one (1) and the numbers of turns of the coils C are fractions. The whole winding set L shown in FIG. 12 is obtained by implementing the wire winding configuration of FIG. 8 while setting the number of partial windings (n) to two (2) and setting the number of coil groups (g) to one (1). The number of consecutive coils is four (4), and the number of coil sharing is one (1). As explained above, concerning the number of consecutive coils and the number of coil sharing, although specific values are used herein in order to facilitate explanation, it is also possible to employ other values. As in FIG. 9, the numbers of turns of the sub coils are denoted by the numerals shown inside the circles in FIG. 12.

When the phase difference of the induced voltage generated in each sub coil is expressed in electrical angle while using the phase of the induced voltage in the sub coil closest to U within the coil group as the reference, the phase difference of the second sub coil from U is 20°, the phase difference of the third sub coil is 40°, and the phase difference of the fourth sub coil is 60°. In order to achieve a state in which the amplitude and the phase of the induced voltage is equal in the respective partial windings, it is necessary that the number of turns of $S_{(1,a)}$ be made equal to the number of turns of $S_{(2,a)}$. In the example shown in FIG. 12, for a=2, with the number of turns of $S_{(1,2)}$ being four (4) and the number of turns of $S_{(2,2)}$ being six (6), these values are not equal but can be made equal by changing the both values to five (5). For a=3, equal number of turns can be achieved similarly. In contrast, for a=1, with the number of turns of $S_{(1,1)}$ being three (3) and the number of turns of $S_{(2,1)}$ being two (2), these values are not equal. If the number of turns for both $S_{(1,1)}$ and $S_{(2,1)}$ is set to three (3), the total number of turns wound on the polar tooth, obtained by adding together the number of turns of the coil belonging to the adjacent coil group, would be twelve (12). This value is larger than the number of turns for the coils $C_2$ and $C_3$ (i.e., ten (10)), and it is not possible to wind twelve (12) turns on the polar tooth due to space limitations. On the other hand, if the number of turns for both sub coils $S_{(1,1)}$ and $S_{(2,1)}$ is set to two (2), magnetic flux generated by the overall coil group would become reduced, so that it may become impossible to attain the required motor performance. Meanwhile, when realizing the effective number of turns of two and a half (2.5), which satisfies the requirements due to space limitations and required performance, the number of turns cannot be made equal for $S_{(1,1)}$ and $S_{(2,1)}$. The situation is the same for a=4. As such, a phase difference is present between the induced voltages generated in the partial windings $N_1$ and $N_2$, and a circulating current is caused to flow.

For the purpose of achieving minimization of the circulating current, focus is placed on the magnitude of phase difference between the induced voltages generated in the respective sub coil groups each of which is constituted with sub coils that belong to a certain partial winding and that belong to a certain coil group. In cases in which the number of coil groups (g) is even, even when the phase difference between the sub coil groups is large, the phase difference can be cancelled between the sub coil groups by configuring the numbers of turns of the sub coils as described above. In contrast, in cases in which the number of coil groups (g) is odd, the phase difference cannot be cancelled between the sub coil groups. For this reason, in order to reduce the phase difference between the induced voltages in the respective partial windings, it is necessary to reduce the phase difference between the sub coil groups. The phase difference between the sub coil groups can be reduced by configuring such that the phase of each individual sub coil group corresponds, as much as possible, to the mean phase of the phases of the sub coils constituting the sub coil group. By using the phase at the center of the sub coil group as the reference, the phases of the respective sub coils can be expressed as −30°, −10°, +10°, and +30°. As these phases are the deviations of the electrical angle positions of the sub coils, by using these values and the formula (7), it is possible to assess the numbers of turns of the sub coils shown in FIG. 12. By performing actual calculations, the value obtained by the formula (7) is 0.5 for both of the sub coil groups in FIG. 12, and this value is the smallest value that can be obtained for the combinations of numbers of turns of the respective sub coils that realize the effective numbers of turns necessary for achieving the required performance and the like. Here, in the calculation of the parameter of the formula (7), the deviation denoted in the parentheses ( ) in the formula is calculated by assuming that the interval between adjacent sub coils corresponds to a deviation having the value of one (1). This deviation value is obtained by dividing each of the sub coil phases −30°, −10°, +10°, and +30° by 20°, which is the phase difference between adjacent sub coils, and then normalizing the results. According to the arrangement of FIG. 12, the phase difference between the partial windings $N_1$ and $N_2$ is minimized to 1.2°.

As described above, when the number of coil groups (g) is odd, by selecting the numbers of turns of the sub coils such that the value calculated by the formula (7) becomes smallest, degradation in efficiency and controllability caused by the circulating current can be suppressed while using a non-integer value as a number of turns.

As may be recognized by those of ordinary skill in the pertinent art based on the teachings herein, numerous changes and modifications may be made to the above-described and other embodiments of the present invention without departing from its scope as defined in the appended claims. Accordingly, this detailed description of embodiments is to be taken in an illustrative as opposed to a limiting sense.

What is claimed is:

1. A three-phase AC motor comprising:
a stator that includes T polar teeth arrayed in a circumferential direction and a whole winding formed from a plurality of coils wound in a concentrated manner around the polar teeth, and a rotor disposed in a confronting relationship with the polar teeth,
wherein the plurality of coils forming the whole winding of each of said phases is divided into g coil groups for said each of said phases, wherein each divided coil group comprises coils wound around h of said polar teeth continuously disposed, and d coils of a coil group continuously disposed from an end thereof share at least one polar tooth with coils of a neighboring coil group,
wherein the following relationship is satisfied, wherein T represents said number of polar teeth, g represents said number of coil groups, h represents said number of consecutive coils, and d represent said number of coil sharing, $T=3\times g\times(h-d)$ wherein the whole winding is comprised of n partial windings that are parallel to each other, in which one coil of the whole winding is comprised of n sub coils having a predetermined number of turns, which are formed by the n partial windings,
wherein a total number of turns of sub coils that belong to one partial winding is common between respective partial windings, and
wherein a polar tooth sharing coil turn number, which is an effective number of turns of a coil that shares at least one of said polar teeth with the neighboring coil group, is less than a polar tooth monopolizing coil turn number, which is an effective number of turns of a coil that does not share any of said polar teeth with the neighboring coil group.

2. The three-phase AC motor according to claim 1, wherein at least one coil that constitutes the coil group comprises a plurality of types of sub coils that can be discriminated from each other by the number of turns each of said type form.

3. The three-phase AC motor according to claim 2, wherein an effective number of turns of the coil constituted by a plurality of sub coils that can be discriminated in the number of turns is not an integer.

4. The three-phase AC motor according to claim 1, wherein respective coils that share one polar tooth with a neighboring coil group are identical in the polar tooth sharing coil turn number, and respective coils that do not share any polar tooth with the neighboring coil group are identical in the polar tooth monopolizing coil turn number.

5. The three-phase AC motor according to claim 2, wherein respective coils that share one polar tooth with a neighboring coil group are identical in the polar tooth sharing coil turn number, and respective coils that do not share any polar tooth with the neighboring coil group are identical in the polar tooth monopolizing coil turn number.

6. The three-phase AC motor according to claim 3, wherein respective coils that share one polar tooth with a neighboring coil group are identical in the polar tooth sharing coil turn number, and respective coils that do not share any polar tooth with the neighboring coil group are identical in the polar tooth monopolizing coil turn number.

7. The three-phase AC motor according to claim 4, wherein the total polar tooth sharing coil turn number of coils that share one polar tooth is equal to the polar tooth monopolizing coil turn number.

8. The three-phase AC motor according to claim 5, wherein the total polar tooth sharing coil turn number of coils that share one polar tooth is equal to the polar tooth monopolizing coil turn number.

9. The three-phase AC motor according to claim 6, wherein the total polar tooth sharing coil turn number of coils that share one polar tooth is equal to the polar tooth monopolizing coil turn number.

10. The three-phase AC motor according to claim 4, wherein the polar tooth sharing coil turn number is one-half of the polar tooth monopolizing coil turn number.

11. The three-phase AC motor according to claim 5, wherein the polar tooth sharing coil turn number is one-half of the polar tooth monopolizing coil turn number.

12. The three-phase AC motor according to claim 6, wherein the polar tooth sharing coil turn number is one-half of the polar tooth monopolizing coil turn number.

13. The three-phase AC motor according to claim 1, wherein a sum of the numbers of turns of those of the sub coils that are located at positions having a same electrical angle, among those of the sub coils belonging to a certain partial winding, is equal for all of the partial windings.

14. The three-phase AC motor according to claim 2, wherein a sum of the numbers of turns of those of the sub coils that are located at positions having a same electrical angle, among those of the sub coils belonging to a certain partial winding, is equal for all of the partial windings.

15. The three-phase AC motor according to claim 3, wherein a sum of the numbers of turns of the those of sub coils that are located at positions having a same electrical angle, among the sub coils belonging to a certain partial winding, is equal for all of the partial windings.

16. The three-phase AC motor according to claim 1, wherein
in a sub coil group that belongs to a certain partial winding and that belongs to a certain coil group, an absolute value of a sum of products obtained, for each sub coil belonging to said sub coil group, by multiplying a positional deviation thereof and the number of turns of said each sub coil is minimum, and said positional deviation of a sub coil is an oriented distance, in terms of electrical angle position, from a center position of a coil group to a position of said sub coil.

17. The three-phase AC motor according to claim 2, wherein in a sub coil group that belongs to a certain partial winding and that belongs to a certain coil group, an absolute value of a sum of products obtained, for each sub coil belonging to said sub coil group, by multiplying a positional deviation thereof and the number of turns of said each sub coil is minimum, and said positional deviation of a sub coil is an oriented distance, in terms of electrical angle position, from a center position of a coil group to a position of said sub coil.

18. The three-phase AC motor according to claim 3, wherein in a sub coil group that belongs to a certain partial winding and that belongs to a certain coil group, an absolute value of a sum of products obtained, for each sub coil belonging to said sub coil group, by multiplying a positional deviation thereof and the number of turns of said each sub coil is minimum, and said positional deviation of a sub coil is an oriented distance, in terms of electrical angle position, from a center position of a coil group to a position of said sub coil.

\* \* \* \* \*